(12) United States Patent
Visco et al.

(10) Patent No.: US 6,887,361 B1
(45) Date of Patent: May 3, 2005

(54) METHOD FOR MAKING THIN-FILM CERAMIC MEMBRANE ON NON-SHRINKING CONTINUOUS OR POROUS SUBSTRATES BY ELECTROPHORETIC DEPOSITION

(75) Inventors: Steven J. Visco, Berkeley, CA (US); Craig Jacobson, Lafayette, CA (US); Lutgard C. DeJonghe, Lafayette, CA (US)

(73) Assignee: The Regents of the University of California, Oakland, CA (US)

( * ) Notice: Subject to any disclaimer, the term of this patent is extended or adjusted under 35 U.S.C. 154(b) by 447 days.

(21) Appl. No.: 10/061,127

(22) Filed: Jan. 30, 2002

Related U.S. Application Data

(60) Provisional application No. 60/278,554, filed on Mar. 22, 2001, and provisional application No. 60/335,404, filed on Oct. 30, 2001.

(51) Int. Cl.$^7$ .............................................. C25D 13/02
(52) U.S. Cl. ....................................... 204/491; 204/490
(58) Field of Search ................................ 204/490, 491

(56) References Cited

U.S. PATENT DOCUMENTS

| | | | |
|---|---|---|---|
| 5,240,480 A | | 8/1993 | Thorogood et al. |
| 5,318,951 A | * | 6/1994 | Shintaku et al. ............. 505/472 |
| 5,328,779 A | | 7/1994 | Tannenberger et al. |
| 5,366,770 A | | 11/1994 | Wang |
| 5,670,270 A | | 9/1997 | Wallin |
| 5,932,368 A | | 8/1999 | Batawi et al. |
| 5,938,822 A | | 8/1999 | Chen et al. |
| 5,993,986 A | | 11/1999 | Wallin et al. |
| 6,217,732 B1 | * | 4/2001 | Schuh et al. ................ 204/490 |
| 6,270,642 B1 | * | 8/2001 | Basu et al. .................. 204/487 |
| 6,358,567 B2 | | 3/2002 | Pham et al. |
| 6,368,383 B1 | | 4/2002 | Virkar et al. |
| 6,605,316 B1 | * | 8/2003 | Visco et al. ................. 427/115 |
| 2001/0012576 A1 | | 8/2001 | Christiansen |
| 2002/0048699 A1 | | 4/2002 | Steele et al. |

FOREIGN PATENT DOCUMENTS

| | | |
|---|---|---|
| GB | 1 383 343 A | 2/1974 |
| WO | WO 97 00734 A | 1/1997 |

OTHER PUBLICATIONS

Ishihara et al., "Electrophoretic Deposition of Y2O3–Stabilized ZrO2 on the Porous La0.8Sr0.2 MnO3 Cathode Substrate for SOFC", Proceedings of the Fourth International Symposium on Solid Oxide Fuel Cells, 334–343, Electrochemical Soc., Inc., 1995.*

Ishihara et al. ("Electrophoretic Deposition of Y2O3–Stabilized ZrO2 Electrolyte Film in Solid Oxide Fuel Cells", J. Am. Ceram Soc., 79(4)913–919 (1996).*

(Continued)

*Primary Examiner*—Kishor Mayekar
(74) *Attorney, Agent, or Firm*—Beyer Weaver & Thomas LLP

(57) ABSTRACT

A disclosed method provides techniques for forming low-cost, mechanically strong, highly electronically conductive porous structures for solid-state electrochemical devices. In particular, a method of forming a ceramic film on a substrate using electrophoretic deposition (EPD) is described. The method employs a colloidal dispersion of particles during the EPD process where a distribution of particle sizes is selected to eliminate drying cracks in the ceramic film prior to firing of the ceramic film-coated substrate. The method may be used to provide a high-density green film which can be sintered on to a non-shrinking substrate. For instance, a thin film of YSZ with a high green density may be sintered on to a non-shrinking LSM substrate. In particular embodiments, the distribution of particle sizes used in the EPD process may be selected to reduce a firing temperature and a firing time during sintering of the film coated substrate.

53 Claims, 8 Drawing Sheets

OTHER PUBLICATIONS

Yao, et al, "Improved preparation procedure and properties for a multiplayer piezoelectric thick–film actuator", Sensors and Actuators A 71, accepted May 1, 1998, pp. 139–143.

Seabaugh, et al., "Low–Cost Fabrication Processes for Solid Oxide Fuel Cells", Oct. 30, 2000, NexTech Materials, Ltd.

Fujii, K., et al., "Manufacturing and Characterization of Metallic System Support Tube for Solid Oxide Fuel Cells", Bulletin of the Electrotechnical Laboratory, vol. 62, No. 1–2, 1998, pp. 1319.

Momma, et al., "High Potential Performance of Tubular Type SOFC Using Metallic System Components", Electrotechnical Laboratory, Electrochemical Proceedings vol. 97–40, Jun. 1997, pp. 310–321.

Okuo, et al., "Development of Metallic Substrate Tubular SOFC", Electrotechnical Laboratory, Oct. 1994, pp. 908–919.

Okuo, T., et al., "Improvement in Power Stability and Durability Demonstration on New Tubular Type SOFC Using Metallic System Component", vol. 60, No. 5, 1996 pp. 1–9.

Schiller, G., et al., "Development of Metallic Substrate Supported Thin–Film SOFC by Applying Plasma Spray Techniques", Electrochemical Society Proceedings vol. 99–19, Oct. 1999, pp. 892–903.

Schiller, G., et al., "Development of Plasma Sprayed Components for a New SOFC Designs", Electrochemical Proceedings vol. 97–40, Oct. 1999, pp. 634–645.

Schiller, G. et al., "Development of SOFC Components by Vacuum Plasma Spraying", 1998, pp. 515–518.

Takenoiri, et al., "Development of Metallic Substrate Supported Planar SOFC at Fuji Electric", Fuel Cell Seminar Abstracts, Nov. 1998, pp. 84–87.

Unal, et al., "Microstructures of $Y_2O_3$–Stabilized $ZrO_2$ Electron Beam–Physical Vapor Deposition Coatings on Ni–Base Superalloys", Department of Materials Science and Engineering, vol. 984–92, 1994, pp. 984–992.

Wallin, et al., "Cofired Solid Oxide Fuel Cells for Operation at 800° C.", 1997,Abstract.

* cited by examiner

METHOD FOR MAKING THIN-FILM CERAMIC MEMBRANE ON NON-SHRINKING CONTINUOUS OR POROUS SUBSTRATES BY ELECTROPHORETIC DEPOSITION

CROSS-REFERENCE TO RELATED APPLICATIONS

This application is related to U.S. Provisional Application No. 60/278,554, METHOD FOR MAKING THIN-FILM CERAMIC MEMBRANE ON NON-SHRINKING CONTINUOUS OR POROUS SUBSTRATES BY ELECTROPHORETIC DEPOSITION, field Mar. 27, 2001, the disclosure of which is herein incorporated by reference for all purposes and this application is related to U.S. Provisional Application No. 60/335,404 METHOD FOR MAKING THIN-FILM CERAMIC MEMBRANE ON NON-SHRINKING CONTINUOUS OR POROUS SUBSTRATES BY ELECTROPHORETIC DEPOSITION, filed Oct. 30, 2001, the disclosure of which is herein incorporated by reference for all purposes.

BACKGROUND OF THE INVENTION

The present invention relates generally to the field of solid state electrochemical devices, and more particularly to methods of fabricating substrate, electrode and cell structures for solid state electrochemical devices.

Solid state electrochemical devices are often implemented as cells including two porous electrodes, the anode and the cathode, and a dense solid electrolyte and/or membrane which separates the electrodes. For the purposes of this application, unless otherwise explicit or clear from the context in which it is used, the term "electrolyte" should be understood to include solid oxide membranes used in electrochemical devices, whether or not potential is applied or developed across them during operation of the device. In many implementations, such as in fuel cells and oxygen and syn gas generators, the solid membrane is an electrolyte composed of a material capable of conducting ionic species, such as oxygen ions, or hydrogen ions, yet has a low electronic conductivity. In other implementations, such as gas separation devices, the solid membrane is composed of a mixed ionic electronic conducting material ("MIEC"). In each case, the electrolyte/membrane must be dense and pinhole free ("gas-tight") to prevent mixing of the electrochemical reactants. In all of these devices a lower total internal resistance of the cell improves performance.

The ceramic materials used in conventional solid state electrochemical device implementations can be expensive to manufacture, difficult to maintain (due to their brittleness) and have inherently high electrical resistance. The resistance may be reduced by operating the devices at high temperatures, typically in excess of 900° C. However, such high temperature operation has significant drawbacks with regard to the device maintenance and the materials available for incorporation into a device, particularly in the oxidizing environment of an oxygen electrode, for example.

The preparation of solid state electrochemical cells is well known. For example, a typical solid oxide fuel cell (SOFC) is composed of a dense electrolyte membrane of a ceramic oxygen in conductor, a porous anode layer of a ceramic, a metal or, most commonly, a ceramic-metal composite ("cermet"), in contact with the electrolyte membrane on the fuel side of the cell, and a porous cathode layer of a mixed ionically/electronically-conductive (MIEC) metal oxide on the oxidant side of the cell. Electricity is generated through the electrochemical reaction between a fuel (typically hydrogen produced from reformed methane) and an oxidant (typically air). This net electrochemical reaction involves charge transfer steps that occur at the interface between the ionically-conductive electrolyte membrane, the electronically-conductive electrode and the vapor phase (fuel or oxygen). The contributions of charge transfer step, mass transfer (gas diffusion in porous electrode), and ohmic losses due to electronic and ionic current flow to the total internal resistance of a solid oxide fuel cell device can be significant. Moreover, in typical device designs, a plurality of cells are stacked together and connected by one or more interconnects. Resistive loss attributable to these interconnects can also be significant.

In work reported by de Souza and Visco (de Sourza, S.; Visco, S. J.; De Jonghe, L. C. Reduced-temperature solid oxide fuel cell based on YSZ thin-film electrolyte. Journal of the Electrochemical Society, vol. 144, (no. 3), Electrochem. Soc., March 1997, p. L35–7.7 ), a thin film of yttria stabilized zirconia (YSZ) is deposited onto a porous cermet electrode substrate and the green assembly is co-fired to yield a dense YSZ film on a porous cermet electrode. A thin cathode is then deposited onto the bilayer, fired, and the assembly is tested as an SOFC with good results. In work reported by Minh (Minh, N. Q. (Edited by: Dokiya, M.; Yamamoto, O.; Tagawa, H.; Singhal, S. C.) Development of thin-film solid oxide fuel cells for power generation applications. Proceedings of the Fourth International Symposium on Solid Oxide Fuel Cells (SOFC-IV), (Proceedings of the Fourth International Symposium on Solid Oxide Fuel Cells (SOFC-IV), Proceedings of Fourth International Symposium Solid Oxide Fuel Cells, Yokohama, Japan, 18–23 June 1995.) Pennington, N.J., USA: Electrochem. Soc., 1995, p. 138–45), a similar thin-film SOFC is fabricated by tape calendaring techniques to yield a good performing device. However, these Ni-YSZ supported thin-film structures are mechanically weak, and will deteriorate if exposed to air on SOFC cool-down due to the oxidation of Ni to NiO in oxidizing environments. Also, nickel is a relatively expensive material, and to use a thick Ni-YSZ substrate as a mechanical support in a solid state electrochemical device will impose large cost penalties.

Solid state electrochemical devices are becoming increasingly important for a variety of applications including energy generation, oxygen separation, hydrogen separation, coal gasification, and selective oxidation of hydrocarbons. These devices are typically based on electrochemical cells with ceramic electrodes and electrolytes and have two basic designs: tubular and planar. Tubular designs have traditionally been more easily implemented than planar designs, and thus have been preferred for commercial applications. Presently, the electrolyte layer is deposited onto the porous tube through physical vapor deposition techniques known as electrochemical vapor deposition. Although this technique produces excellent films, it is inherently a batch process and capital intensive.

If a wet technique could be used to deposit a film onto the LSM tube, substantial cost savings could be realized. However, attempts to use colloidal deposition techniques failed due to the large volumetric changes in the electrolyte during sintering which are not compensated by concomitant shrinkage of the substrate. Therefore it was recognized that a key issue for success would be to maximize the green density of the deposited film in order to minimize shrinkage of the film shrinkage and build up of stresses in the film which may lead to cracking or delamination. Initial attempts to fabricate high quality films (onto a non-shrinking substrate) by electrophoretic deposition (EPD) according to established practices failed.

Accordingly, away of reducing the materials and manufacturing costs and increasing the reliability of solid state electrochemical devices, such as depositing a film via EPD, would be of great benefit and, for example, might allow for the commercialization of such devices previously too expensive, inefficient or unreliable.

SUMMARY OF THE INVENTION

In general, the present invention provides low-cost, mechanically strong, highly electronically conductive porous structures for solid-state electrochemical devices and techniques for forming these structures. In particular, the invention provides a method of forming a ceramic film on a substrate using electrophoretic deposition (EPD). The method employs a colloidal dispersion of particles during EPD process where a distribution of particle sizes is selected to eliminate drying cracks in the ceramic film prior to firing of the ceramic coated substrate. The method may be used to provide a high-density green film which can be sintered on to a non-shrinking substrate. For instance, a thin film of YSZ with a high green density may be sintered on to a non-shrinking LSM substrate. In particular embodiments, the distribution of particle sizes used in the EPD process may be selected to reduce a firing temperature and a firing time during sintering of the film coated substrate. One aspect of the present invention provides a method of forming a ceramic coating on a solid state electrochemical device substrate. The method may be generally characterized as comprising: 1) providing a solid state electrochemical device substrate, the substrate consisting essentially of a material selected from the group consisting of a porous non-noble transition metal, a porous non-noble transition metal alloy, a porous cermet incorporating one or more of a non-noble non-nickel transition metal and a non-noble transition metal alloy, a porous cermet incorporating nickel, and a porous metal oxide or mixed metal oxide (such as LSM); 2) generating a suspension of ceramic material in a liquid medium; 3) applying a coating of the suspension of the ceramic material in a liquid medium to the substrate material using electrophoretic deposition; and 4) drying the coated substrate material where the ceramic material in the liquid medium is comprised of ceramic particles with a size distribution selected to eliminate cracking in the coating applied to the substrate during drying of the coated substrate. The size distribution of the ceramic particles may also be selected to reduce a firing time of the coated substrate or may be selected to reduce a firing temperature of the coated substrate. In one embodiment, the sizes of the ceramic particles may range from about 0.1 to 1 microns. The substrate may be planar or tubular shaped.

In particular embodiments, the coated substrate material may be dried in air at room temperature up to about 80° C. The method may also comprise: 1) stirring the suspension of ceramic material during the electrophoretic deposition and applying a voltage profile during the electrophoretic deposition. The voltage profile may be a constant voltage or a time varying voltage. The voltage profile may ramped up to yield a current density of about 10 to 50 $\mu A/cm^2$.

In other embodiments, the liquid medium may be a non-electrolytic solvent such as isopropyl alcohol (IPA). The concentration of ceramic particles of the IPA may be about 0.25 grams of ceramic material per 100 ml IPA to 1 gram of ceramic material per 100 ml IPA. The suspension of ceramic material in the liquid medium may be generated by dispersing a ceramic powder in the liquid medium using an ultrasonic probe.

In another embodiment, the method may also comprise firing the coated substrate in an inert or reducing atmosphere. The firing may be conducted at a temperature sufficient to substantially sinter and densify the coating without melting the substrate. In one embodiment, the firing temperature is between about 1200 and 1400° C. and the firing time is between about 0.5 and 4 hours.

The sintered coating may be gas-tight and greater than about 90% densified. Also, in some case, the sintered coating may be no more than 2% porous. The sintered coating may be about 1 to 50 $\mu m$ thick. The sintered coating material and the substrate may have substantially matched coefficients of thermal expansion. In addition, the sintered coating material and the substrate may have coefficients of thermal expansion within about 20% of one another, within about 10% of one another and within about 2% of one another.

The electrochemical device substrate may be a high-strength metal or alloy support. A thin layer of a material having high electrocatalytic activity may be cast on top of the porous high-strength metal or alloy support. In one embodiment, the layer of material having high electrocatalytic activity comprises Ni-YSZ.

The substrate material may be selected from the group consisting of transition metals chromium, silver, ion, copper, and nickel. The substrate material may also be an alloy selected from the group consisting of a low-chromium ferritic steel, an intermediate-chromium ferritic steel, a high-chromium ferritic steel, a chrome-based alloy, and chrome-containing nickel-based Inconel alloy where the alloy is selected from the group consisting of Cr5Fe1Y and Inconel 600. The substrate material may be a cermet selected from the group consisting of at least one of $La_{1-x}Sr_xMN_yO_{3-\delta}$ ($1 \geq X \geq 0.05$) ($0.95 \leq y \leq 1.15$) ("LSM"), $La_{1-x}Sr_xCoO_{3-\delta}$ ($1 \geq X \geq 0.10$) ("LSC"), $SrCo_{1-x}Fe_xO_{3-\delta}$ ($0.30 \geq X \geq 0.20$), $La_{0.6}Sr_{0.4}Co_{0.6}Fe_{0.4}O_{3-\delta}$, $Sr_{0.7}Ce_{0.3}MnO_{3-\delta}$, $LaNi_{0.6}Fe_{0.4}O_{3-\delta}$, $Sm_{0.5}Sr_{0.5}CoO_{3-\delta}$, yttria stabilized zirconia (YSZ), scandia stabilized zirconia (SSZ), $(CeO_2)_{0.8}(Gd_2O_3)_{0.2}$ (CGO), $La_{0.8}Sr_{0.2}Ga_{0.85}Mg_{0.15}O_{2.825}$ (LSGM20-15), $(Bi_2O_3)_{0.75}(Y_2O_3)_{0.25}$ and alumina, in combination with at least one of transition metals Cr, Fe, Cu, Ag, an alloy thereof, a low-chromium ferritic steel, an intermediate-chromium ferritic steel, a high-chromium ferritic steel, a chrome-based alloy, and chrome-containing nickel-based Inconel alloy where the LSM is selected from the group consisting of $La_{0.8}Sr_{0.2}MnO_{3-\delta}$, $La_{0.65}Sr_{0.30}MnO_{3-\delta}$, $La_{0.45}Sr_{0.55}MnO_{3-\delta}$, and the chrome based alloy is Cr5Fe1Y.

The coating material may also be solely an ionic where the coating material comprises at least one of yttria stabilized zirconia (YSZ), scandia stabilized zirconia (SZ), doped cerium oxide including $(CeO_2)_{0.8}(Gd_2O_3)_{0.2}$ (CGO), $La_{0.8}Sr_{0.2}Ga_{0.85}Mg_{0.15}O_{2.825}$ (LSGM20-15) and $(Bi_2O_3)_{0.75}(Y_2O_3)_{0.25}$. The yttria stabilized zirconia may be at least one of $(ZrO_2)_{0.92}(Y_2O_3)_{0.08}$ and $(ZrO_2)_{0.90}(Y_2O_3)_{0.10}$. The coating may also be a mixed ionic electronic where the coating comprises at least one of $SrCo_{1-x}Fe_xO_{3-\delta}$ ($0.30 \geq X \geq 0.20$), $La_{0.6}Sr_{0.4}Co_{0.6}Fe_{0.4}O_{3-\delta}$, $La_{0.8}Sr_{0.2}MnO_3$, $La_{0.65}Sr_{0.30}MnO_{3-\delta}$, $La_{0.45}Sr_{0.55}MnO_{3-\delta}$, $Sr_{0.7}Ce_{0.3}MnO_{3-\delta}$, $LaNi_{0.6}Fe_{0.4}O_{3-\delta}$, $Sm_{0.5}Sr_{0.5}CoO_{3-\delta}$ and $La_{1-x}Sr_xCoO_{3-\delta}$. In particular, the coating may be $SrCo_{0.75}Fe_{0.25}O_{3-\delta}$.

Another aspect of the present invention provides a method of forming a YSZ (Yittria Stabilized Zirconia) ceramic coating on an LSM (Lanthanum Strontium manganite) substrate using EPD (electrophoretic deposition). The method may be generally characterized as comprising: 1) providing the LSM substrate; 2) generating a suspension of YSZ material in a liquid medium, 2) applying a coating of the suspension of the YSZ material in a liquid medium to the LSM substrate material using EPD; and 3) drying the coated LSM substrate where the YSZ material in the liquid medium is comprised of YSZ particles with a size distribution selected to eliminate cracking in the coating applied to the LSM substrate during drying of the YSZ coated LSM substrate. The size distribution may be selected to reduce a firing time of the YSZ coated LSM substrate and to reduce a firing temperature of the YSZ coated LSM substrate. The sizes of the YSZ particles may range from about 0.1 to 1 microns.

In particular embodiments, the method may also comprise applying a voltage profile during the electrophoretic wherein the voltage profile is ramped up to yield a current density of about 10 to 50 $\mu A/cm^2$. The liquid medium may be a non-electrolytic solvent such as isopropyl alcohol (IPA). The concentration of the YSZ particles in the (IPA) may be about 0.25 grams of YSZ material per 100 ml IPA to 1 gram of YSZ material per 100 ml IPA. The method may also comprise firing the coated substrate in an inert or reducing atmosphere where the firing temperature is between about 1200 and 1400° C. and the firing time is between about 0.5 and 4 hours.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawing.

DETAILED DESCRIPTION OF THE INVENTION

Figure 1:
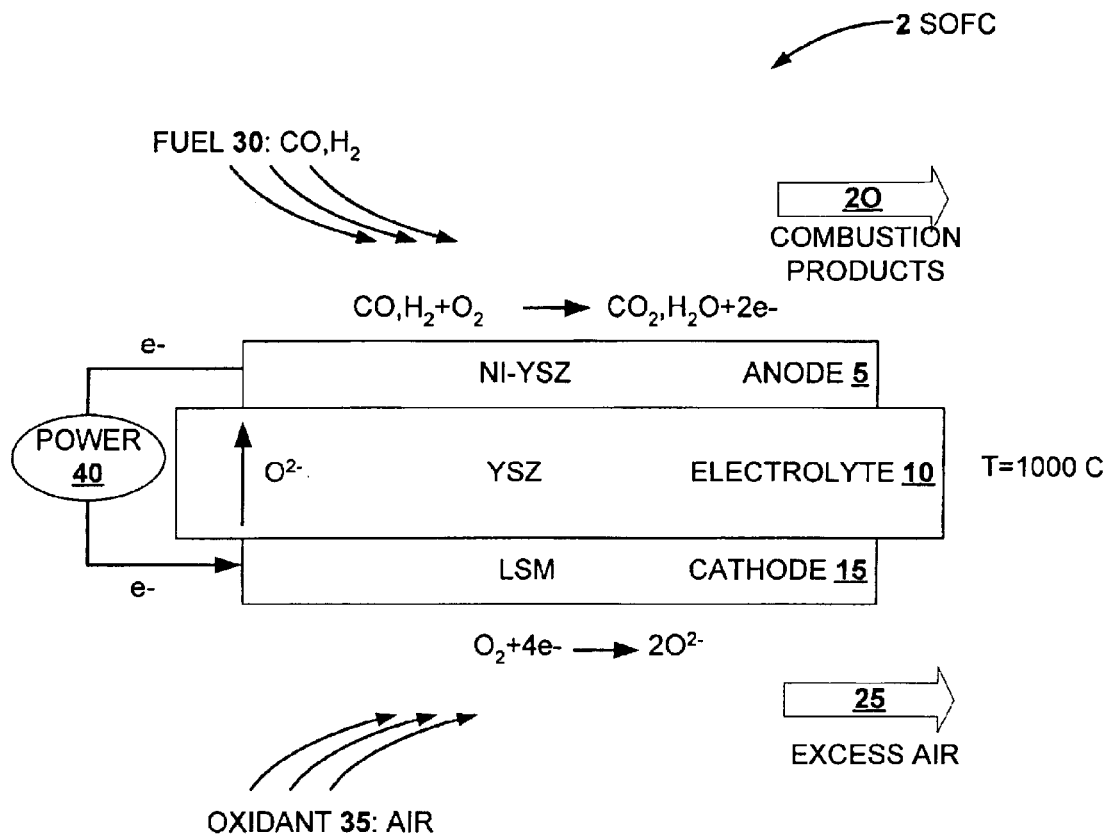
FIG. 1 depicts a cross section for a solid oxide fuel cell (SOFC).

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

In general, the present invention provides low-cost, mechanically strong, highly electronically conductive porous structures for solid-state electrochemical devices and techniques for forming these structures. In particular, the invention provides a method of forming a ceramic film on a substrate using electrophoretic deposition (EPD). The method employs a colloidal dispersion of particles during EPD process where a distribution of particle sizes is selected to eliminate drying cracks in the ceramic film prior to firing of the ceramic coated substrate. The method may be used to provide a high-density green film which can be sintered on to a non-shrinking substrate. For instance, a thin film of YSZ with a high green density may be sintered on to a non-shrinking LSM substrate. In particular embodiments, the distribution of particle sizes used in the EPD process may be selected to reduce a first temperature and a firing time during sintering of the film coated substrate.

Details of solid-electrochemical devices that may be constructed with the present invention are described with respect to FIGS. 1, 2, 3A and 3B. Details of a method of forming a ceramic film on a substrate using electrophoretic deposition (EPD) of the present invention are described with respect to FIGS. 4, 5 and 6. Fabrication techniques where the ceramic coated substrate is fired are described with respect to FIGS. 7, 8 and 9.

Introduction

An overview of solid state device components and construction, and the two basic designs follows. This description is provided both by way of background and introduction to the subject, and to provide design and fabrication details that may be adopted in compositions, devices, and methods in accordance with the present invention. Additional details of solid state device components and construction that may be used with the present invention are provided in co-pending U.S. application No. 09/626,629, filed Jul. 27, 2000 by Jackson, et al., and titled, "Structures and Fabrication Techniques for Solid State Electrochemical Devices," which is incorporated herein in its entirety and for all purposes.

A fuel cell is an energy conversion device that generates electricity and heat by electrochemically combining a gaseous fuel and an oxidant gas across an ion conducting electrolyte. The electrolyte may be a solid or a liquid. Typically, a fuel cell converts chemical energy directly into electrical energy at a conversion efficiency that is much greater than thermo-mechanical methods such as a steam turbine powered by steam generated from burning a fossil fuel. Because of their high efficiency, fuel cells have a much lower carbon dioxide emissions than fossil fuel based technologies for the same power output. Fuel cells also produce negligible amounts of $SO_x$ and $NO_x$, the main constituents of acid rain and photochemical smog.

There are many different types of fuel cells. The main difference between each type of fuel cell is the material used for the electrolyte. The material used for the electrolyte affects the operating temperature of the device. Solid oxide fuel cell (SOFCs) are constructed from solid-state materials, utilizing an ion-conducting oxide ceramic as the electrolyte, and are operated in the temperature range of 900–1000 C. The SOFC fuel cell is a subset of solid state electrochemical devices that may be used for other purposes besides energy conversion. For instance, solid state electrochemical devices related to SOFC may be used for oxygen generation.

FIG. 1, illustrates a cross section of a fuel cell, in particular solid oxide fuel cell (SOFC) 2. The SOFC unit consists of two electrodes (an anode 5 and a cathode 15) separated by an electrolyte 15. In this example, a Nickel-yttria-stabilized zirconia cermet (Ni/YSZ) is the material used for the anode 15. Lanthanum strontium manganite (LSM) is the material used for the cathode 15 and YSZ is used for the electrolyte. Many other combinations of materials may be used to construct an SOFC as is described with respect to FIGS. 2, 3A and 3B.

Fuel 30, such as $H_2$ or $CH_4$ (the present invention may be used with fuels other than $H_2$ and $CH_4$), is supplied to the anode 5, where it is oxidized by oxygen ions ($O_2$) from the electrolyte 10, which releases electrons to the external circuit. On the cathode 15, an oxidant such as $O_2$ or air is fed to the cathode, where it supplies the oxygen ions for the electrolyte to accepting electrons from the external circuit. The electrolyte 10 conducts these ions between the electrodes, maintaining overall electrical charge balance. The flow of electrons in the external circuit provides power 40, which may siphoned off from the external circuit for other uses.

Figure 2:
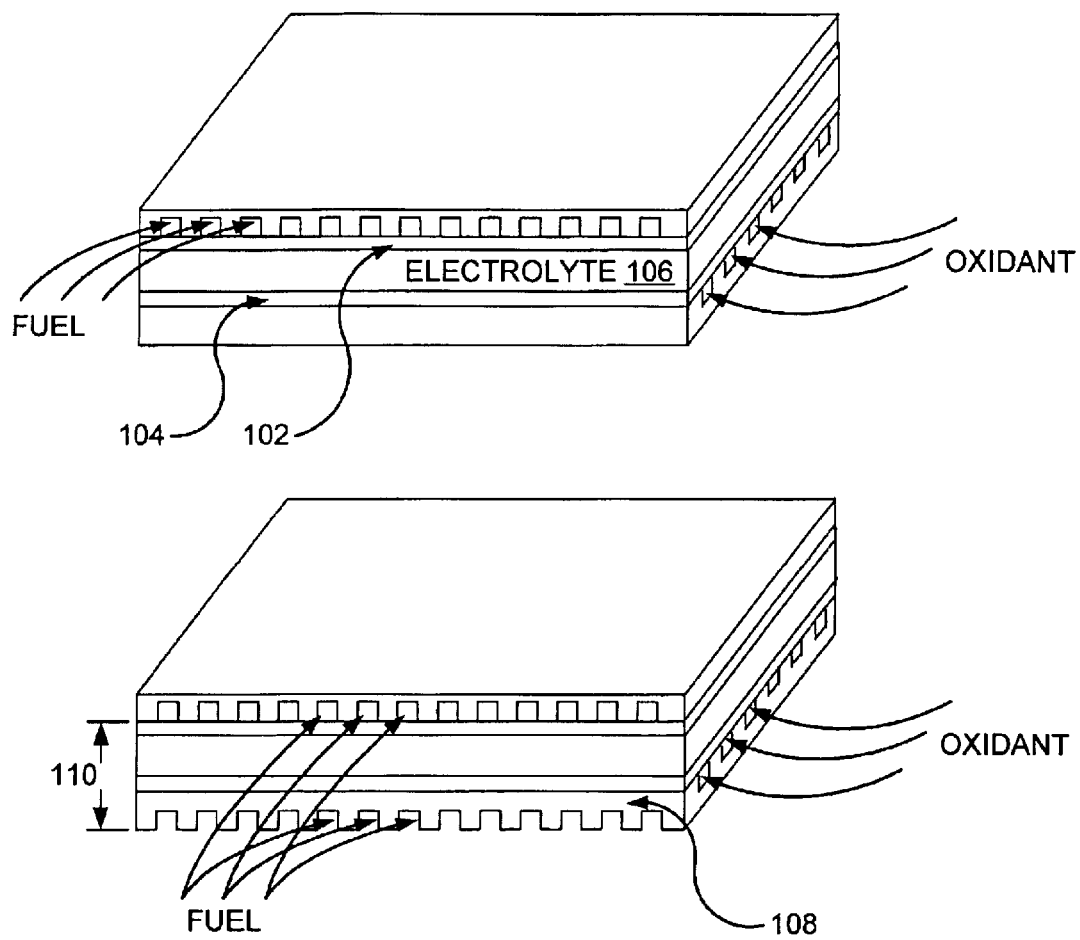
FIG. 2 depicts a planar design for a solid state electrochemical device.

FIG. 2 illustrates a basic planar design for a solid state electrochemical device, for example, a solid oxide fuel cell (SOFC). The cell 100 includes an anode 102 (the "fuel electrode") and a cathode 104 (the "air electrode") and a solid electrolyte 106 separating the two electrodes. In conventional OSFCs, the electrodes and electrolytes are typically formed from ceramic materials, since ceramics are able to withstand the high temperatures at which the devices are operated. For example, SOFCs are conventionally operated at about 950° C. This operating temperature is determined by a number of factors, in particular, the temperature required for the reformation of methane to produce hydrogen and reaction efficiency considerations. Also, typical solid state ionic devices such as SOFCs have a structural element onto which the SOFC is built. In conventional planar SOFCs the structural element is a thick solid electrolyte plate such as yttria stabilized zirconia (YSZ); the porous electrodes are then screen-printed onto the electrolyte. The porous electrodes are of low strength and are not highly conductive. Alternatively, a thick porous electrode and a thin electrolyte membrane can be co-fired, yielding a electrode/electrolyte bilayer. As noted above, for the case where the electrode is a Ni-YSZ electrode of a few mm in thickness, the electrode strength is low and the cost of raw materials high.

Methane (natural gas) is plentiful, inexpensive, and rich in hydrogen, the actual fuel for the cell, and as such, is the preferred fuel source for a SOFC. Methane may be reformed to produce hydrogen at a temperature of about 650–950° C. Therefore, it is desirable to operate a SOFC at least the lower end of this temperature range.

Another consideration governing the temperature at which a SOFC or any solid state electrochemical device is operated is the electrolyte/membrane conductivity. Conventional devices must be operated at a high enough temperature to make the ceramic electrolyte sufficiently ionically conductive for the energy producing reactions (in the case of a SOFC; other reactions for gas separators or generators). The thickness of the solid electrolyte, typically hundreds of micron thick, favors an operating temperature above 900° C. in order to achieve an acceptable conductivity. Methods exist for forming thin electrolytes on ceramic substrates, such as EVD/CVD. However, EVD/CVD is a complex and expensive technique, and the ceramic-based devices to which the technique has been applied still require high operating temperatures to be at all efficient. Unfortunately, most metals are not stable at this temperature in an oxidizing environment and very quickly become converted to brittle oxides. Accordingly, solid state electrochemical devices have conventionally been constructed of heat-tolerant ceramic materials, such as $La_{1-x}Sr_xMn_yO_{3-\delta}$ ($1 \geq X \geq 0.05$) ($0.95 \leq y \leq 1.15$) ("LSM"), and yttria stabilized zirconia (e.g., $(ZrO_2)_{0.92}(Y_2O_3)_{0.08}$) ("YSZ"). In an SOFC, this limitation is most problematic at the air electrode where oxidation can take place. In other solid state electrochemical devices, such as oxygen generators, both electrodes may be in an oxidizing environment during operation of the device, and so both may face this problem.

Referring again to FIG. 2, the cell 100 is depicted in the form in which it could be stacked with other like cells 110, as it typically would be to increase the capacity of the device. To be stacked, the cells require bipolar interconnects 108 adjacent to each electrode that are electrically, but not ionically, conductive. The interconnects 108 allow current generated in the cells to flow between cells and be collected for use. These interconnects are typically formed into manifolds through which fuel and air may be supplied to the respective electrodes (allow lateral movement of gas in channels; but not allow intermixing of gas (vertical movement)). Due to the highly exothermic combustion resulting from an uncontrolled mixture of hydrogen and oxygen, it is essential that the interconnect manifolds by well-stated at all edges of the planar cell. Moreover, due to required operating temperatures in excess of 900° C. (e.g., 950° C.) for conventional devices, the interconnect in contact with the air electrode may not be made of metal due to high temperature corrosion.

Prior designs for solid state electrochemical planar stack devices have used ceramic material such as lanthanum chromite to form interconnects. However, lanthanum chromite is a very expensive material, sometimes accounting for as much as 90% of the cost of a device. In addition, it is a relatively brittle material (relative to metal); less than ideal for an application requiring an absolute seal, and is significantly less conductive than metal, resulting in resistive losses that reduce the overall efficiency of the device. These problems have combined to make current planar stack implementations impractical for commercial applications.

Figure 3A:
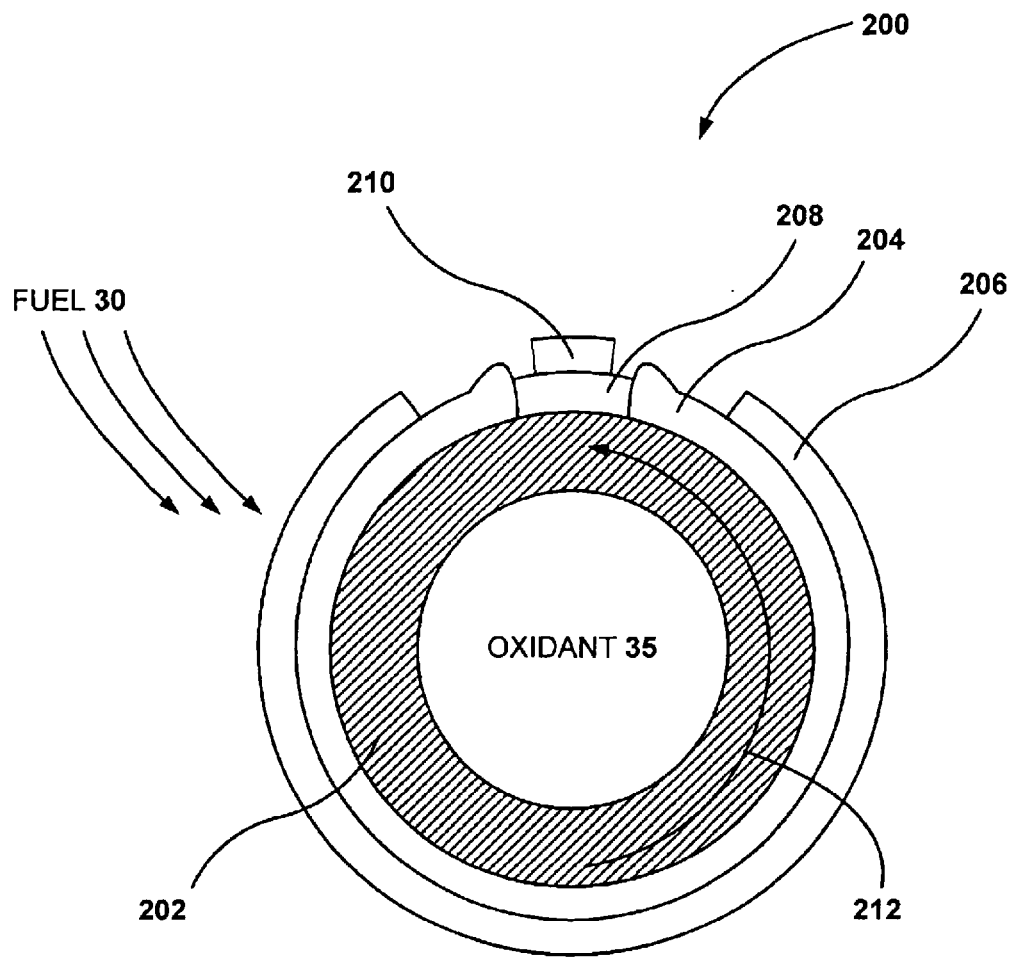
FIGS. 3A and B depict a tubular design for a solid state electrochemical device.
Figure 3B:
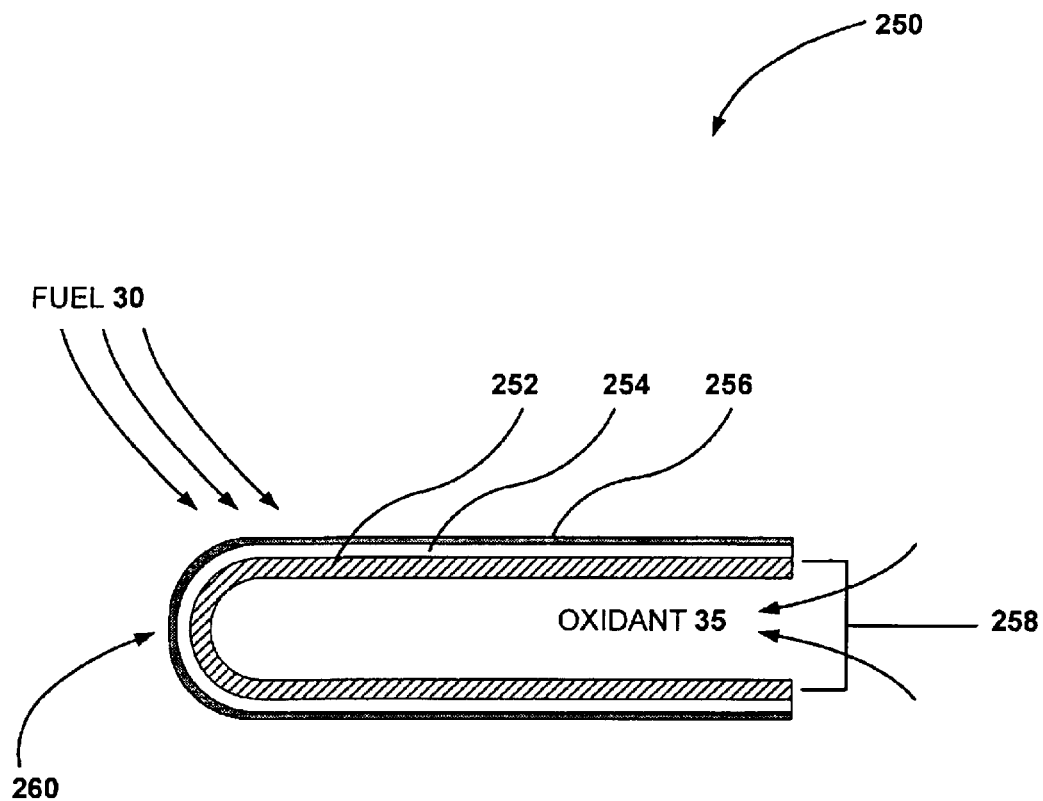

At alternative solid state electrochemical device design generally recognized as having much reduced safety concerns and greater reliability is depicted in FIGS. 3A–B. This design, commercialized by Westinghouse, for example, has a tubular shape. FIG. 3A depicts an axial cross-sectional view of a tubular SOFC 200. The inner tube is the air electrode 202, again formed from a solid ceramic material such as LSM. The air electrode 202 is coated with a solid electrolyte 204 for most of its circumference. The electrolyte is coated with the fuel electrode 206. During operation, an oxidant 35 such as air is flowed through the interior of the tube, while fuel 30 (generally methane that is reformed to hydrogen during operations of the cell) is provided outside the tube. In the case of the tubular SOFC, one of the major fabrication costs is associated with the deposition of the electrolyte film by conventional chemical vapor deposition-electrochemical vapor deposition (CVD-EVD) techniques.

In order to get current produced by the fuel cell out, an electrically conductive material in contact with the electrodes is required. The material must also provide a chemical barrier to prevent intermixing of the hydrogen fuel outside the tube and the air inside. An interconnect 208, again typically composed of lanthanum chromite, is provided on the air electrode 202 over that portion of the circumference not covered by the electrolyte 204. The interconnected is also typically has an interconnect contact 210 attached to it.

FIG. 3B depicts a lengthwise cross sectional view of a tubular solid state electrochemical device, such as depicted in FIG. 3A. The device 250 has a tubular shape formed by a porous air electrode (anode) 252, and electrolyte 254, and a porous fuel electrode (cathode) 256, in the case of an SOFC application of the device. The tube-shaped device has an open end 258 available for providing an oxidant 35, such as air in the case of an SOFC (as shown), or extracting a gas product, such as oxygen in the gas of an oxygen generator, and a closed end 260 to contain and separate the gas inside the tube from that outside. In the case of a SOFC, the fuel gas 30, e.g., hydrogen or methane, is typically provided outside the tube.

In this design, the seal preventing intermixing of reactant gasses, such as hydrogen fuel and air in a SOFC, are much more easily implemented. Rather than requiring a seal around all the edges, as in a planar device, the tubular device need only be sealed at the open end 258 of the tube (or can even be sealless and allowed to leak). Moreover, this end may be located out of the hot zone of the operational device. This makes the seal easier to maintain and thus renders the device more safe and reliable than conventional planar designs.

The tubular design has the significant drawback that current collection for the whole tube occurs at only a small area on the circumference of the tube. Referring to FIG. 3A, all current coming from all around the tube gets collected at the interconnect 208. Thus, the maximum current path 212 is about half the circumference of the tube, which may be centimeters as opposed to microns as in the case for the planar implementation As a result, the tubular implementation has much lower power density than the planar devices, making the development of high power density devices using this design impractical. In addition, this design retains the drawback of being composed of materials (ceramic electrodes and interconnects) that contribute significantly to the device's internal resistive losses, thereby limiting power density.

While the designs depicted and described in FIGS. 2 and 3A–3B are intended for use as a SOFC, the same or a similar device designs might also be used for gas separation or generation depending on the selection of materials used as the electrodes and separators, the environment in which the device is operated (gases supplied at each electrode), pressures or electrical potentials applied, and the operation of the device. For example, as described above, for a fuel cell, a hydrogen-based fuel (typically methane that is reformed to hydrogen during operation of the device) is provided at the fuel electrode and air is provided at the air electrode. Oxygen ions ($O^{2-}$) formed at the air electrode/electrode interface migrate through the electrolyte and react with the hydrogen at the fuel electrode/electrolyte interface to form water, thereby releasing electrical energy that is collected by the interconnect/current collector.

In the case of the fuel cell, the electrolyte is composed of a solely ionic conducting material, such as yttria stabilized zirconia (YSZ). If the same device is operated as an electrolytic device, that is, rather than getting energy out of the device, energy is provided to the device as a potential applied across the two electrodes, ions formed from gas (e.g., oxygen ions from air) at the cathode will migrate through the electrolyte (which is selected for its conductivity of ions of a desired pure gas) to produce pure gas (e.g., oxygen) at the anode. If the electrolyte is a proton conducting thin film (for example, doped $BaCeO_3$, doped $SrCeO_3$ or doped $SrZrO_3$) instead of an oxygen ion conductor, the device could be used to separate hydrogen from a feed gas containing hydrogen mixed with other impurities, for instance resulting from the steam reformation of methane ($CH_4+H_2O=3H_2+CO$). Protons (hydrogen ions) formed from the $H_2/CO$ mixture at one electrode/thin film interface could migrate across the thin film driven by a potential applied across the electrodes to produce high purity hydrogen at the other electrode. Thus the device may operate as a gas generator/purifier.

Such a device could also function as a electrochemical syn gas generator. Syn gas ($H_2+CO$) is a valuable product used for synthesis of higher value organics. It is typically produced by the partial oxidation of methane with pure oxygen. Since the pure oxygen must be separated from air in a separate process, syn gas production is relatively expensive. In this case, the feed to the fuel electrode is methane, and air is supplied to cathode, as with the fuel cell. However, the device is run at a current density where methane is only partially oxidized to $H_2$ and CO, as opposed to deep oxidation in typical fuel cell operation to produce $H_2O$ and $CO_2$.

If the solely ionic conducting electrolyte is replaced with a mixed ionic electronic conducting (MIEC) membrane, such as LSM, and instead of applying a potential across the electrodes, air at high pressure is provided on one side of the membrane, oxygen ions formed from the air at the membrane will migrate through the membrane to produce pure oxygen at the other side of the membrane. Thus the device may operate as an oxygen gas separator.

Fabrication Techniques, Compositions and Substrate of the Invention

In the fabrication of ceramic membranes it is desirable in certain instances to be able to deposit a thin ceramic film onto a substrate that will not shrink substantially under the conditions of sintering of the ceramic film. An example of this is a porous lanthanum strontium manganite (LSM) tube used in the Westinghouse tubular solid oxide fuel cell (see FIG. 3A). The porous LSM tube is fired in such a way that over the life of the SOFC, the tube will undergo negligible shrinkage. Presently, the electrolyte layer is deposited onto the porous tube through physical vapor deposition techniques known as electrochemical vapor deposition. Although this technique produces excellent films, it is inherently a batch process and capital intensive.

Figure 4:
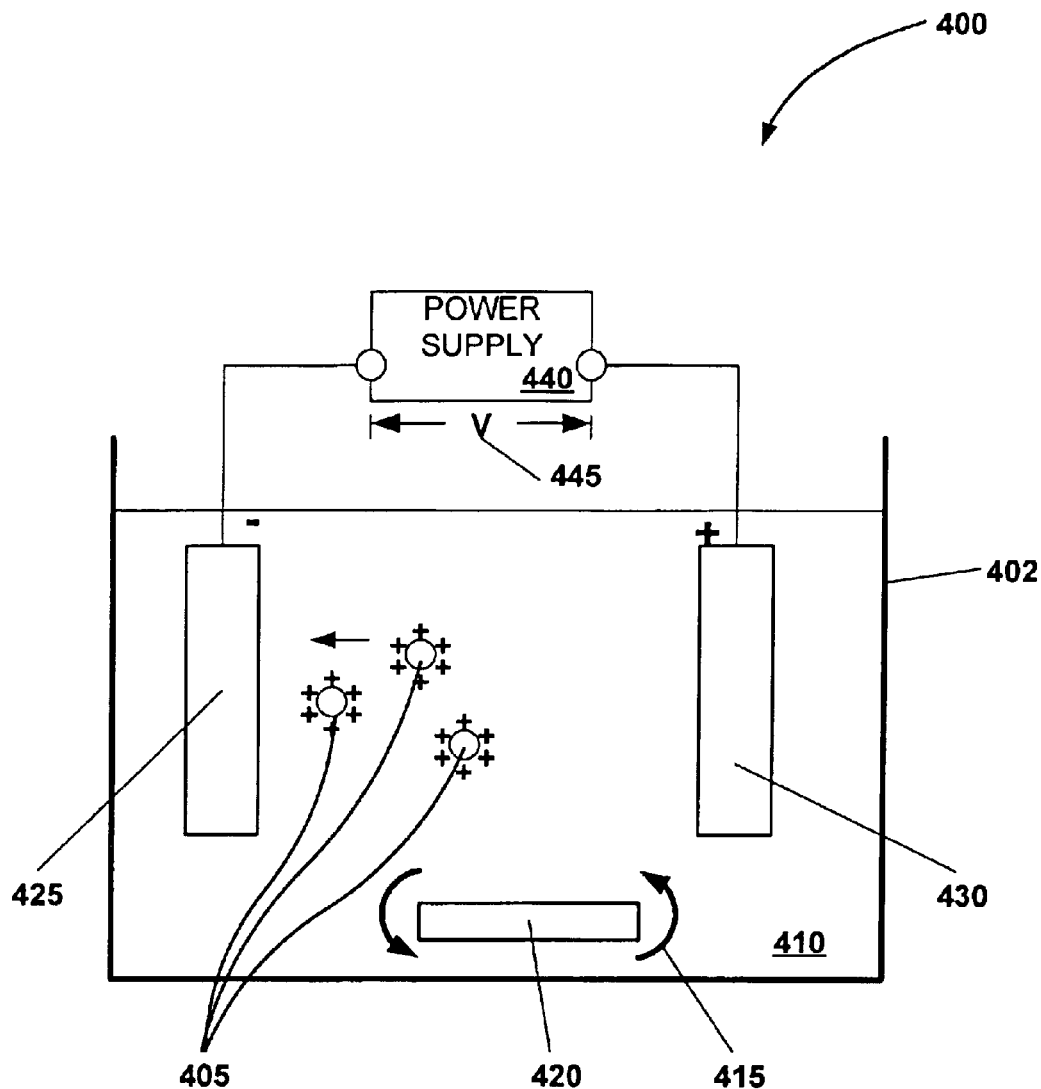
FIG. 4 depicts an apparatus for performing electrophoretic deposition (EPD) to deposit a thin ceramic film on a substrate.

The method of electrophoretic deposition (EPD) has been reported for the fabrication of ceramic articles and thin films. Using EPD, a thin film is deposited on the ceramic, the ceramic article with the thin film is dried, and then fired (see FIG. 5). FIG. 4 depicts an apparatus 400 for performing electrophoretic deposition (EPD) to deposit a thin ceramic film on a substrate 425. For illustrative purposes, the EDP of a thin film of Yttria Stabilized Zirconia (YSZ) 405 on a porous lanthanum strontium manganite (LSM) ceramic article is described. The present invention is not limited to only EPD of YSZ films on LSM and other combinations of film materials and substance materials may be used.

EPD is a process in which ceramic particles 405, suspended in a liquid medium 410 migrate in an electric field and deposit on an electrode 425. In FIG. 4, a power supply with a voltage 440 is used to generate a voltage 445 between a cathode 430 and an anode 425. The anode 425 and the cathode 430 are immersed the suspension of ceramic particles 410 in a container 402. When a voltage is applied, ceramic particles coated with a positive charge 405 are attracted to the anode 425 and deposit themselves on the surface of the anode. The deposited particles form a film on the surface of the anode.

In present invention, the anode 425 may be an article that is film coated during the EPD process such as the planar and tubular surfaces described with respect to FIGS. 2, 3A and 3B. Due to the use of an electric field, EPD may be suited to the formation of uniform films on substrates of complicated shapes, impregnation of porous substrates and deposition on selected areas of the substrates. The deposition rate during EPD may be on the order of about 1–1000 microns per minute and films from about 1–1000 microns may be deposited using EPD. Particle/electrode reactions are not involved in EPD. Thus, the degree of stoichometry in the EPD deposited film is controlled by the degree of stoichometry of the ceramic particles 405 used to generate the suspension 410.

Prior to beginning the EPD process, a suspension 410 of a ceramic material is generated in a liquid medium. A suspension 410 for EPD is a complex system in which each component has a substantial effect on deposition efficiency. Two principle types of solvents may be used: water and inorganic liquids. Organic liquids are used usually preferably to water as a suspension medium since water-based suspensions cause gas formation from the hydrolysis of water.

In general, suspensions may be dispersed by electrostatic, steric or electrosteric stabilization mechanisms. The ceramic particles 405 must be electrically charged to allow for film formation via EPD. The charge on a collodial particle 405 may originate from various sources, such as from adsorbed simple inorganic ions or from dispersants. A binder may also be added to the liquid 410 to increase adherence and strength of the deposited material and prevent cracking.

During EPD, the deposition rate may depend on but is not limited to an applied electric field (e.g., 445), a suspension concentration and an electrophoretic mobility of the suspended particles (e.g., 405). A constant-current or constant-voltage regime may be used for EPD. In addition during EPD, the applied electric field may vary as a function of time. The electric field drives ceramic particles toward the electrode and exerts a pressure on the deposited layer. It may be desirable to maintain a high-potential difference between the anode 425 and the cathode 430. The use of high voltages may have the advantage of smaller deposition times and higher deposit thicknesses. However, too low or too high a voltage may result in deposited layers that exhibit poor post-sintering qualities. Thus, a voltage profile is selected for the EPD process that produces a high-quality film after sintering.

The suspension concentration and particle sizes may produce settling in the suspension 410. For instance, when relatively large particles 405 are used, such as about 1 micron in diameter, the suspension 410 may be stirred to prevent settling. The stirring may be accomplished using a stirring mechanism such as a magnetic stir bar 420. A stirring rate may be about 10 to 100 rpm.

The electrophoretic mobility of the suspended particles and the applied electric field may affect a settling and sedimentation rate in the suspension 410. These affects may vary according to the sizes of particles 405 used in the suspension 410. With larger particles, higher voltages and smaller deposition times may be preferable because shorter deposition times allow deposition without stirring. With smaller particles, however, a high electric field and stirring may induce aggregation and sedimentation of the particles which reduces the deposition process efficiency. The aggregation of the particles from the high electric fields may also bring about porosity in the resulting deposited film.

In the past, high solids loading in the liquid medium has typically been used with EPD in order to maximize the rate of deposition of the suspended ceramic material to a substrate. High solid loading is usually obtained by mixing a very fine ceramic material (e.g., very small particle size) in the liquid medium. However, for the deposition of thin films, such as in the range of about 1–50 microns, the deposition rate may not be as important as when a thicker film is desired.

The size of particles used in the EPD process may be also be determined according to desired firing conditions for the firing process of the ceramic film-coated substrate. In the firing process, the ceramic film is sintered. During sintering, small particle sizes are advantageous because one of the primary driving forces in sintering is a change in surface area of particles in the ceramic film which is inversely proportional to the size of particles in the pre-sintered film. Thus, for a given film thickness, the sintering driving forces increase as the particle sizes in the film decrease in some instances, a film generated in the EPD process with smaller particles may be fired at a lower temperature and for less time as compared to a film generated using larger particles. Lower firing temperatures and smaller firing times may be advantageous in the fabrication process. For instance, the maximum firing temperature and maximum firing time may be limited by properties of the substrate material. Therefore, in the past, to aid in the firing process, the high solid loading in the liquid medium for the EPD process has been accomplished by using very small ceramic particles such as those contained in nano-powders.

Prior to the firing process, the ceramic film-coated substrate is removed from the suspension and dried. During drying, cracks may form in the ceramic film. In many cases, these cracks are not healed during the sintering process which may severely degrade the quality of the resulting ceramic film after firing. One of driving forces for drying cracks is the size of the particles used to deposit the ceramic film using EPD. The drying cracking forces typically increase as the size of the particles in the deposited ceramic film decrease. Thus, high solids loading can cracks in the deposited thin film during drying that reduce the quality of the resulting thin film after firing.

In the present invention, a particle size distribution that is used to generate a suspension of particles in the liquid medium used during EPD may be selected to eliminate drying cracks. Further, the particle size distribution may be selected to affect firing conditions such as to low the firing temperature or lower the firing time. For instance, a particle size distribution may be selected to eliminate drying cracks and at the same time lower the required firing temperature of the film deposited using EPD. The ceramic material with the selected particle size distribution may be mixed with the liquid medium to generate a suspension 410 for the EPD process and a compatible voltage profile may be used with the suspension to generate a film-coated article 425 via EPD.

In one example, provided for illustrative purposes only, high density YSZ layers may be formed in accordance with the present invention by the electrophoretic deposition process when a well dispersed, stable (no flocculation during deposition) suspension of particles 410 that have a narrow size distribution are used in a liquid medium. Dispersions of Tosoh YSZ (Yttria Stabilized Zirconia) in isopropyl alcohol (IPA) may be used to meet this condition. Yttria (8 mol %) stabilized zirconia powder from Tosoh USA, Inc. (Atlanta, Ga.) may be dispersed in isopropanol using a high intensity ultrasonic probe (10–15 min). In this example, these conditions form a suitable stable colloidal dispersion 410 for the EPD process.

In general, a non-electrolytic solvent may be selected for the liquid medium 410 according to a voltage level used during the EPD process. IPA is one solvent compatible with the voltage levels sued during the EPD of YSZ on LSM. The EPD of other materials may require different voltage levels. Thus, the present invention is not limited to IPA solvents.

In the example above, the size distribution of the YSZ, particles may vary between 0.1 and 1 micron. In one embodiment, the size distribution of particles included a maximum number of particles at about 0.3 microns. As described above, the size of the particles and a resulting size distribution may be selected to eliminate drying cracks after a thin film has been deposited on the ceramic article and to minimize the firing time and firing temperature of the thin film. The size distribution of the particles may vary according to the material being deposited in the EPD process and the type of substrate used.

A concentration of YSZ in the IPA of about (~0.25-1 g YSZ/100 ml IPA) resulted in deposited films of a sufficient quality after sintering. There is a lower limit of YSZ concentration, below which poor quality layers may be formed. Higher concentrations of suspensions lead to lower green densities and may lead to non-uniform deposition. One suitable concentration is 0.5 g YSZ/100 ml IPA.

A voltage profile is selected such that deposition may be carried out in a controlled fashion and produce a uniform layer. Typically, the voltage controlling the current is ramped up to yield a moderate current density (~10–50 $\mu A/cm^2$). In one embodiment, the voltage was ramped up to 600 Volts and then held constant. There is a lower limit of the current density, below which poor quality layers may result. Also if the current density (or voltage) is too high, as described above in relation to high dispersion concentrations, lower green densities and poor layers may result. A Princeton Applied Research Model 173 Potentiostat/Galvanostat may be used and the potential may be monitored using a Fluke 77 multimeter.

Figure 5:
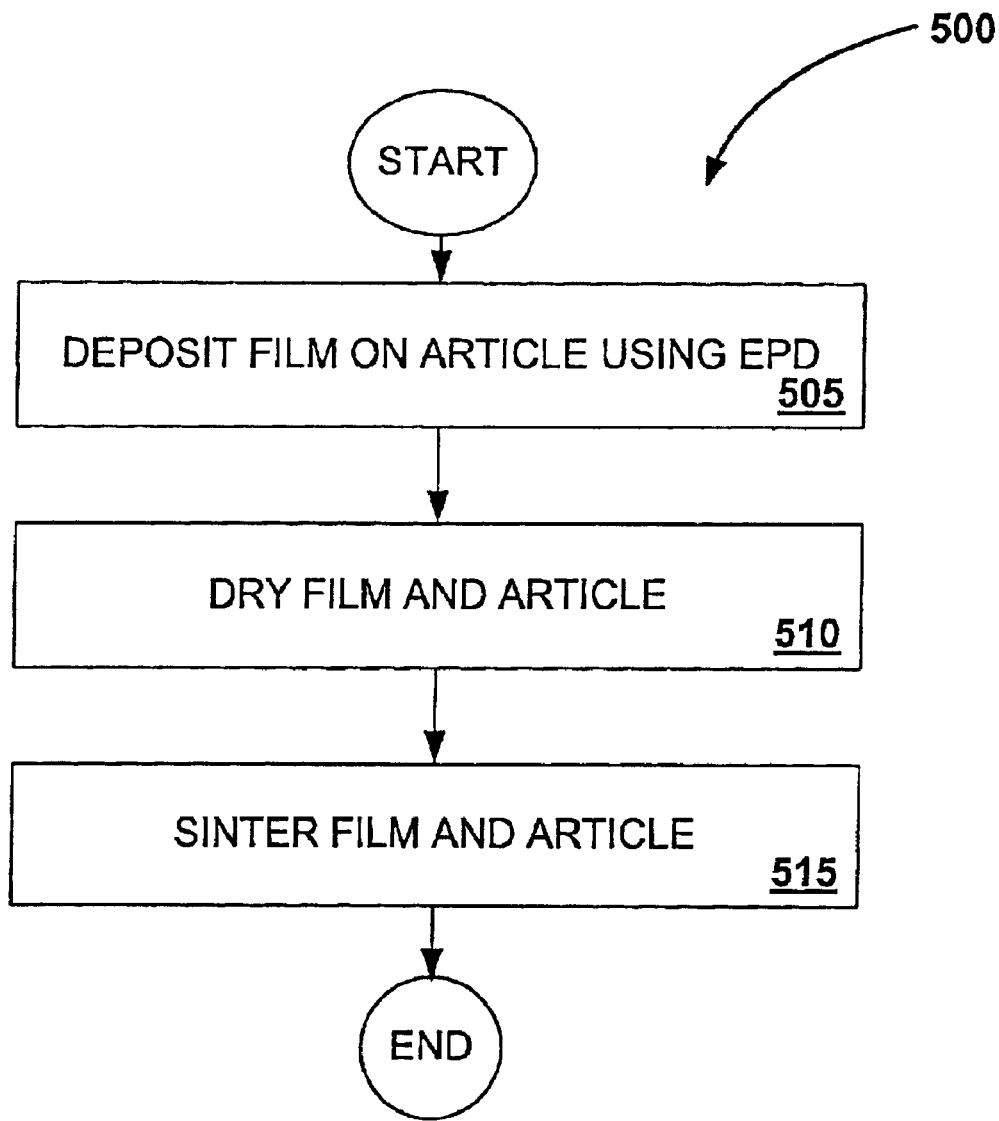
FIG. 5 is a flow chart depicting a method for generating a ceramic coated article of the present invention.

FIG. 5 is a flow chat depicting a method 500 for generating a ceramic coated article of the present invention. In 505, a thin ceramic film is deposited on a substrate using an EPD process as described with respect to FIGS. 4 and 6. In 510, the film-coated substrate is dried. In 515, the film-coated substrate is fired to sinter the film to the substrate. Details of the firing process are described with respect to FIG. 7.

Figure 6:
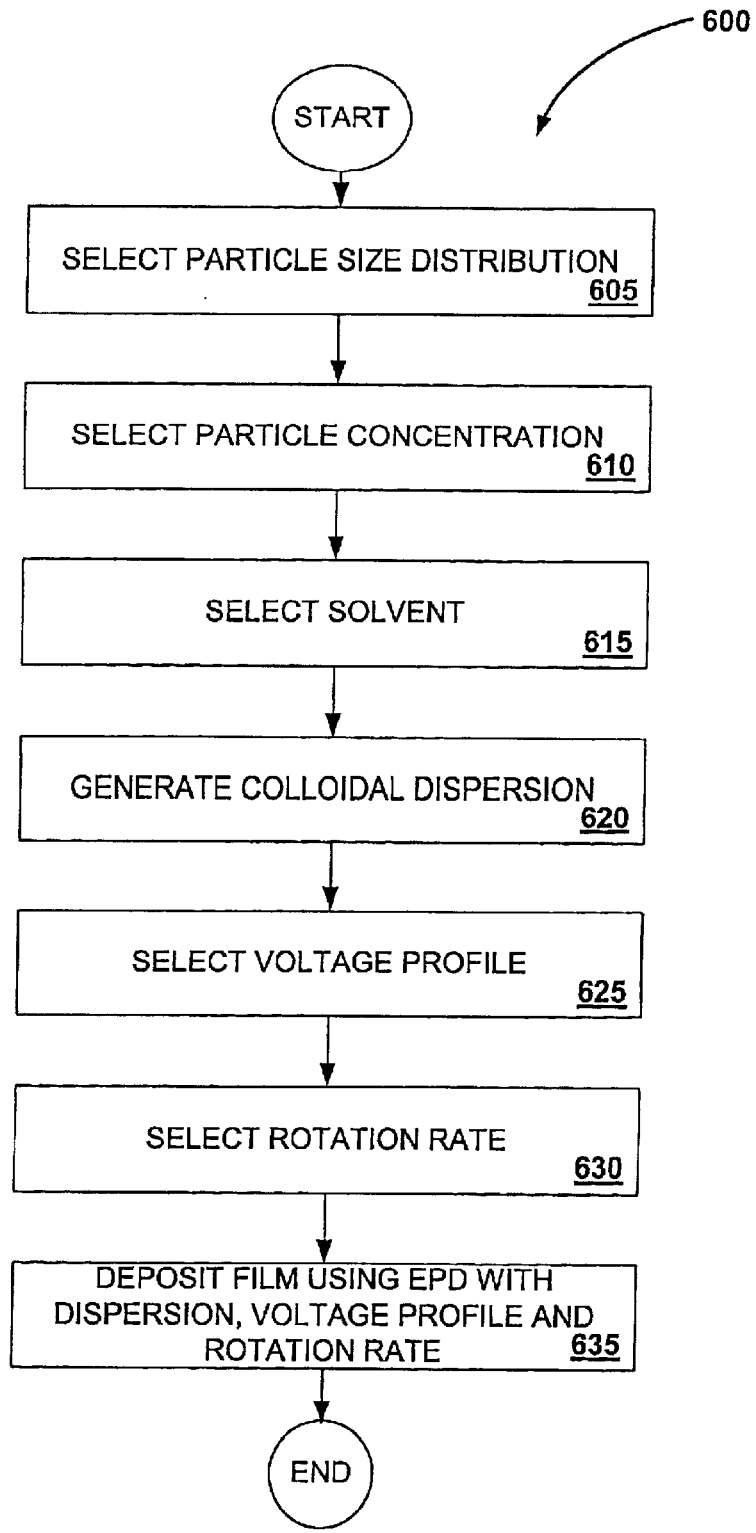
FIG. 6 is a flow chart depicting a method of depositing a ceramic film using EPD.

FIG. 6 is a flow chart depicting 505 a method of depositing a ceramic film using EPD. In 605, 610, 615, a particle size distribution, a particle distribution and a solvent are selected for the EPD process 505. The parameters of the EPD process in FIG. 6 are selected to generate a uniform deposited film on a substrate during EPD that has satisfactory qualities, such as minimum macro-cracking and micro-cracking after sintering of the deposited film on to a substrate. As described above, these parameters may vary according to the film material and a substrate material used with the EPD process. In 620, a colloidal dispersion is generated. In 625, a voltage profile for the EPD process is selected. As described with respect to FIG. 4, the voltage profile, particle concentration and particle size distribution may interact to affect the deposition process. Thus, these interactions may be considered in the voltage profile selection process.

In 630, a rotation rate for stirring may be selected for the EPD process. The stirring rate may depend on the selected particle sizes, selected particle concentration and the selected voltage profiles. In 635, the EPD process is applied with the selected parameters for 605, 610, 615, 625 and 630.

In the present invention, an unfired ("green") solid state electrochemical device substrate material is formed and coated with a thin layer of electrolyte/membrane material. The substrate material may be a cermet, for example, composed of 50 vol % $Al_2O_3$ (e.g., AKP-30) and 50 vol % Inconel 600 (available from Powder Alloy Corp) with a small amount of binder (e.g., XUS 40303 from Dow Chemical Company). The cermet components may be mixed in water and dried, and the resulting powder ground and sieved, for example to less than about 100 $\mu$m. The powder may be pressed (e.g., at about 5000 lbs.) into a green substrate layer, for example, in the form of a disk.

Of course, other solid state electrochemical device substrates may be used. Suitable substrate materials in accordance with the present invention includes other cermets, metals and alloys. Suitable ceramic components for cermets include $La_{1-x}Sr_xMn_{yl}$ $_{O3-\delta}$ ($1 \geq X \geq 0.05$) ($0.95 \leq y \leq 1.15$) ("LSM"), $La_{1-x}Sr_xCoO_{3-\delta}$ ($1 \geq X \geq 0.10$) ("LSC"), $SrCo_{1-x}Fe_xO_{3-\delta}$ ($0.30 \geq X \geq 0.20$), $La_{0.6}Sr_{0.4}Co_{0.6}Fe_{0.4}O_{3-\delta}$, $Sr_{0.7}Ce_{0.3}MnO_{3-\delta}$, $LaNi_{0.6}Fe_{0.4}O_3$, $Sm_{0.5}Sr_{0.5}CoO_3$, yttria stabilized zirconia (YSZ), scandia stabilized zirconia (SSZ), $(CeO_2)_{0.8}(Gd_2O_3)_{0.2}$ (CGO), $La_{0.8}Sr_{0.2}Ga_{0.85}Mg_{0.15}O_{2.825}$ (LSBM20-15), $(Bi_2O_3)_{0.75}(Y_2O_3)_{0.25}$ and alumina. Preferred LSM materials include $La_{0.8}Sr_{0.2}MnO_3$, $La_{0.65}Sr_{0.30}MnO_{3-\delta}$, $La_{0.45}Sr_{0.55}MnO_{3-\delta}$. suitable metal components for the cermets are transition metals Cr, Fe, Ag and/or alloys such as low-chromium ferritic steels, such as type 405 and 409 (11–15% Cr), intermediate-chromium ferritic steels, such as type 430 and 434, (16–18% Cr), high-chromium ferritic steels, such as type 442, 446 and E-Brite (19–30% Cr), chrome-based alloys such as Cr5Fe1Y and chrome containing nickel-based Inconel alloys including Inconel 600 (Ni 76%, Cr 15.5%, Fe 5%, Cu 0.2%, Si 0.2%, Mn 0.5%, and C 0.08%). The substrate material may also be a porous metal such as transition metals chromium, silver, copper, iron and nickel, or a porous alloy such as low-chromium ferritic steels, such as type 405 and 409 (11–15% Cr), intermediate-chromium ferritic steels, such as type 430 and 435, (16–18% Cr), high-chromium ferritic steels, such as type 442, 446 and E-Brite (19–30% Cr), chrome-based alloys such as Cr5Fe1Y and chrome-containing nickel-based Inconel alloys including Inconel 600 (Ni 76%, Cr 15.5%, Fe 8%, Cu 0.2%, Si 0.2%, Mn 0.5% and C 0.08%).

In some embodiments of the present invention, the substrate may be a porous non-nickel cermet incorporating one or more of the transition metals Cr, Fe, Cu and Ag, or alloys thereof. These metals are particularly well-suited for use in the high temperature reducing or oxidizing environments of some components of solid state electrochemical devices, particularly oxidizing electrodes and interconnects, since under such conditions they form a thin oxide surface layer having a growth rate constant of no more than about $1 \times 10^{-12}$ $cm^2/sec$ that protects them from further oxidation while they retain their beneficial metal properties. Porous substrates made from these materials preferably have a fracture strength in excess of 5 Mpa (megapascals), more preferably 40 MPa, and still more preferably 100 MPa. Examples of these materials include YSZ-Cr5Fe1Y, CGO-Cr5Fe1Y, YSZ-SS409, 410 or 430, and CGO-SS409, 410 or 430.

The electrolyte membrane material may be a thin layer of a metal oxide (ceramic) powder, such as yttria stabilized zirconia (YSZ) (e.g., $(ZrO_2)_{0.92}(Y_2O_3)_{0.08}$ or $(ZrO_2)_{0.80}(Y_2O_3)_{0.20}$) available for example, from Tosoh Corp. Other possible electrolyte materials include $(ZrO_2)_{0.9}(Sc_2O_3)_{0.1}$ scandia stabilized zirconia (SSZ), $(CeO_2)_{0.8}(Gd_2O_3)_{0.2}$ (CGO), $La_{0.8}Sr_{0.2}Ga_{0.85}Mg_{0.15}O_{2.825}$ (LSGM20-15) and $(Bi_2O_3)_{0.75}(Y_2O_3)_{0.25}$. Alternatively, the membrane material may be a mixed ionic electronic conductor, for example, $SrCo_{1-x}Fe_xO_{3-\delta}$ ($0.30 \geq X \geq 0.20$), $La_{0.6}Sr_{0.4}Co_{0.6}Fe_{0.4}O_{3-\delta}$, $La_{0.8}Sr_{0.2}MnO_3$, $La_{0.65}Sr_{0.30}MnO_3$, $La_{0.45}Sr_{0.55}MnO_3$, $Sr_{0.7}Ce_{0.3}MnO_{3-\delta}$, $LaNi_{0.6}Fe_{0.4}O_3$, $LaNi_{0.6}Fe_{0.4}O_3$, $Sm_{0.5}Sr_{0.5}CoO_3$ and $La_{1-x}Sr_xCoO_{3-\delta}$. Such structures may find use in oxygen separation devices, for example, as described above.

The thickness of the densified electrolyte films prepared in accordance with preferred embodiments of the present invention may be from about 1 to 50 microns, more preferably from about 3 to 30 microns; even more preferably about 5 to 20 microns. The fabrication of such thin, substantially gas-tight solid oxide films in an economical manner is an important aspect of the present invention with distinct advantages over the thicker, more expensive and/or more difficult to fabricate electrolyte layers of conventional solid state electrochemical device fabrication.

In one preferred embodiment the substrate is a porous metal, such as Ni or Cr, or even more preferably, a metal alloy such as FeCr and is selected so that its coefficient of thermal expansion (CTE) is close (e.g., within about 20%; preferably within about 10%; more preferably within about 2%) to that of the metal oxide electrolyte film (or other material layer) to be supported. This type of CTE matching of the substrate and thin film layer may be easily determined from literature sources or with minimal experimentation by those skilled in the art.

In such cases where the substrate is a metal or alloy, it is important that the assembly be fired at a temperature sufficient to result in sintering of the green electrolyte film without reaching the melting point of the substrate. Since the atmosphere during sintering is selected to be insert or reducing, the metal or alloy substrate does not substantially oxidize and therefore retains it beneficial metal properties. In many cases, solid state electrochemical devices incorporating structures in accordance with the present invention will be capable of efficient operation at temperatures below those at which the metals or alloys would oxidize too rapidly in an oxidizing environment (e.g., about 650–800° C.). Depending on the composition of the various components within the parameters defined herein, devices in accordance with the present invention may be suitable for operation through a range of temperatures from about 400 to 1000° C. In one embodiment, SOFC devices in accordance with the present invention are operated at about 650° C. so that methane may be reformed for hydrogen fuel during operation of the device. In other embodiments, devices may be effectively operated at temperatures as low as about 400° C.

Moreover, where the porous substrate is used in a reducing or fuel environment, the metal or metal alloy is inherently stable and thus may be formed from a wider array of metals. For example, a porous iron or Inconel support may be used as the robust structural element for the fuel electrode in a SOFC, on top of which a thin layer of a more electrochemically active material, such as Ni-YSZ, may be used for charge/transfer reactions.

The ability to operate solid state electrochemical devices at temperatures below 800° C. provided by the present invention is an important advantage over conventional technology. At such operating temperatures, metals may be used to fabricate components of devices, including substrates and electrodes, as described above, and also importantly interconnects. The ability to use metals rather than ceramics such as lanthanum chromite for interconnects makes sealing of electrochemical devices much easier. Metals are much easier to machine than ceramics, and may be worked with in conventional ways to form good seals and electrical contacts, such as by welding, brazing, etc. Thus, planar electrochemical device designs, with all their low internal resistance characteristics, may be made economically feasible and reliable.

Moreover, the material cost of metal is much lower than the rare earth elements that go into the ceramic and cermet materials they replace. Metals also have higher thermal conductivity than ceramics or cermets which results in results in lower heat-related stresses and reduces the need for cooling with excess gas. Also, metals have higher electrical conductivity, resulting in decrease internal resistance and therefore improved performance of solid state electrochemical devices. Metals are less brittle and therefore less susceptible to catastrophic failure than ceramics allowing the fabrication of larger cells and devices.

As discussed further below, an intermediate layer, for example, a porous electrode layer having a composition such as described above for the support material may be applied between the support material and the electrolyte layer. Further, as described further below, multiple porous layers may be applied to the opposing side of the metal oxide electrolyte layer, and on the opposing side of the porous substrate.

Figure 7:
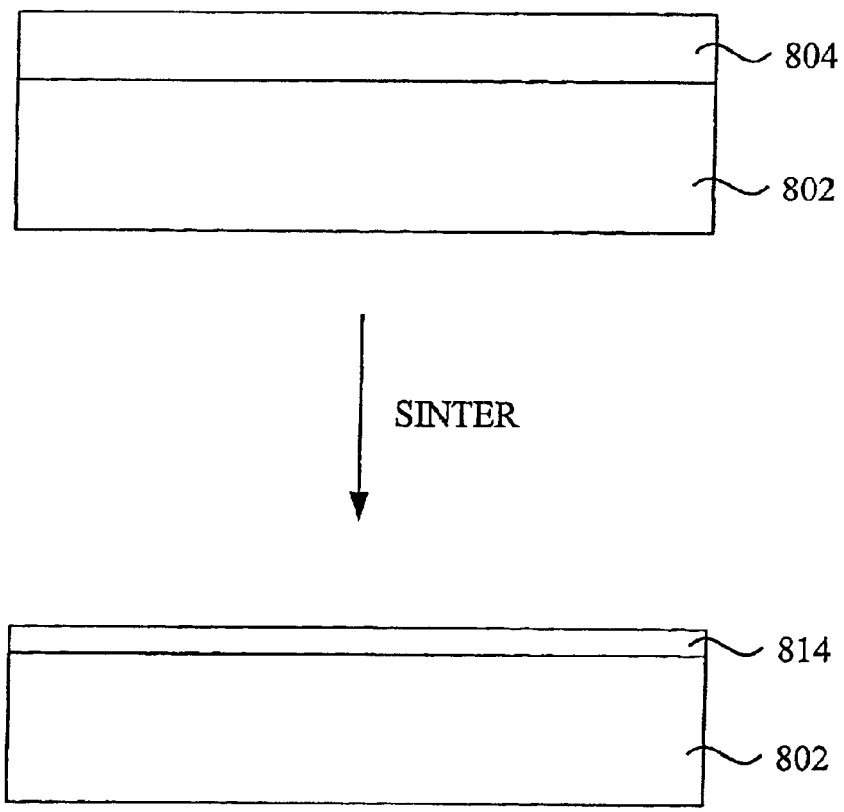
FIG. 7 depicts stages in a constrained sintering process in accordance with one embodiment the present invention.

According to another embodiment of the present invention, a green metal oxide coating may be sintered on a pre-fired porous substrate in a process referred to as constrained sintering. FIG. 7 depicts stages in a constrained sintering process in accordance with one embodiment the present invention. The materials and techniques used to form the substrate and coating components may be otherwise the same as described above with reference to the co-firing process. However, in this embodiment, the substrate 802 is pre-fired, for example at about 1200–1500° C. (e.g., 1350° C.) in a molybdenum or graphite furnace. A green metal oxide material 804 is then applied to the pre-fired substrate, for example in a suspension as described above, and the metal oxide coating is sintered in a reducing atmosphere on the substrate, for example at about 1200–1500° C. (e.g., 1350° C.) in a molybdenum or graphite furnace.

In the case of constrained sintering, the pre-fired porous substrate 802 is invariant, so it is only the coating material layer that shrinks during sintering. The final properties of the substrate 802 and the sintered electrolyte layer 814 should be the same as described above with reference to the co-firing process. That is, the substrate should be porous with about 20% or greater porosity in one embodiment, and the electrolyte membrane should be densified so as to provide a gas-tight membrane, generally at least about 90% densified.

As noted above, structures and devices in accordance with the present invention may also include a plurality of layers on either side of the substrate/electrolyte composite described above. Moreover, it is possible to add a separate thin electrode layer on the substrate layer intermediate between the substrate and the electrolyte. For example, in some instances it may facilitate processing, increase strength and/or decrease device cost to produce a porous substrate from one material that may not have high electrocatalytic activity selected for a particular purpose, and then form a thin electrode on that substrate material according to well known processing techniques, before adding an electrolyte layer according to the procedures described herein. For example, on the substrate side an additional layer may be spray-coated or vacuum infiltrated onto the substrate, then the electrolyte layer may be added and the whole assembly co-fired. A second electrode could added in the as a green layer on the green electrolyte layer and then co-fired with the other two layers, or it could be added after the co-firing of the other two layers and bonded in a second firing step.

The techniques described herein, and the structures they produce may be used in the fabrication of a variety of electrochemical devices, as described above, to reduce cost, improve performance and reliability, and reduce operating temperature for an efficient device. It should be understood that the fabrication techniques and structures described herein may be implemented in either planar or tubular solid state electrochemical device designs.

EXAMPLES

The following examples describe and illustrate aspects and features of specific implementations in accordance with the present invention. It should be understood the following is representative only, and that the invention is not limited by the detail set forth in these examples.

Example 1: Co-firing of YSZ Film on LSM Substrate

A porous LSM (~30% porosity) in a tubular form was obtained from Siemens Westinghouse Power corporation. A suspension of 0.5 g YSZ (0.3 micron particle size)/100 ml IPA was dispersed using a sonic probe for 5 min. The tube was sealed at both ends using Teflon tape and an electrical contact was made using an alligator clip. The counter electrode was stainless steel tube selected such that the inner diameter was ~5 mm larger than the outer diameter of the LSM tube. The tube and counter electrode were immersed in the YSZ suspension in a glass beaker provided with a stirring bar. The solution was stirred to prevent settling of the powder. Electrophoretic deposition was conducted by applying 30 $\mu A/cm^2$ using a potentiostat/galvanostat for a period of 5 min. The current was turned off and the sample removed and allowed to air dry. The sample was placed in a $MoSI_2$ heating element furnace and heated at a rate of 5° C./min to 1300° C. and held for 4 hours. The sample was cooled to room temperature at a rate of 10° C./min. The resulting YSZ film was well adhered and approximately 10 $\mu m$ in thickness.

CONCLUSION

Although the foregoing invention has been described in some detail for purpose of clarity of understanding, those skilled in the art will appreciate that various adaptations and modifications of the just-described preferred embodiments can be configured without departing from the scope and spirit of the invention. Moreover, the described processing distribution and classification engine features of the present invention may be implemented together or independently. Therefore, the described embodiments should be taken as illustrative and not restrictive, and the invention should not be limited to the details given herein but should be defined by the following claims and their full scope of equivalents.

What is claimed is:

1. A method of forming a ceramic coating on a solid state electrochemical device substrate, comprising:

providing a non-shrinking solid state electrochemical device substrate, the substrate consisting essentially of a material selected from the group consisting of a porous non-noble transition metal, a porous non-noble transition metal alloy, a porous cermet incorporating one or more of a non-noble non-nickel transition metal and a non-noble transition metal alloy, a porous cermet, and a porous metal oxide or mixed metal oxide;

generating a suspension of ceramic material in a liquid medium of isopropyl alcohol (IPA), the suspension having a concentration and size distribution of ceramic particles selected to provide a uniform and intact dense ceramic following drying and sintering of the coated substrate;

applying a coating of the suspension of the ceramic material directly to the non-shrinking substrate material using electrophoretic deposition with a ramped voltage profile;

drying the coated substrate material; and sintering the coated, substrate in an inert or reducing atmosphere.

2. The method of claim 1, wherein the coated substrate material is dried in air at room temperature up to about 80° C.

3. The method of claim 1, further comprising:

stirring the suspension of ceramic material during the electrophoretic deposition.

4. The method of claim 1, wherein the voltage profile is a time varying voltage.

5. The method of claim 4, wherein the voltage profile is ramped up to yield a current density of about 10 to 50 $\mu A/cm^2$.

6. The method of claim 1, wherein the size distribution is selected to reduce a firing time of the coated substrate.

7. The method of claim 1, wherein the size distribution is selected to reduce a firing temperature of the coated substrate.

8. The method of claim 1, wherein the sizes of the ceramic particles range from about 0.1 to 1 microns.

9. The method of claim 8, wherein concentration of ceramic particles in the (IPA) is about 0.25 grams of ceramic material per 100 ml IPA to 1 gram of ceramic material per 100 ml IPA.

10. The method of claim 1, wherein the sizes of the ceramic particles are preferably about 0.3 microns.

11. The method of claim 1, wherein the suspension of ceramic material in the liquid medium is generated by dispersing a ceramic powder in the liquid medium using an ultrasonic probe.

12. The method of claim 1, wherein the sintering firing temperature is between about 1200 and 1400° C.

13. The method of claim 12, wherein the firing time is between about 0.5 and 4 hours.

14. The method of claim 1, wherein the firing is conducted at a temperature sufficient to substantially sinter and densify the coating without melting the substrate.

15. The method of claim 14, wherein the sintered coating is gas-tight and greater than about 90% densified.

16. The method of claim 15, wherein the sintered coating is greater than about 95% densified.

17. The method of claim 14, wherein the sintered coating is no more than 2% porous.

18. The method of claim 14, wherein the sintered coating is about 1 to 50 microns thick.

19. The method of claim 14, wherein the sintered coating is about 3 to 30 microns thick.

20. The method of claim 14, wherein the sintered coating is about 5 to 20 micros thick.

21. The method of claim 1, wherein said substrate is planar.

22. The method of claim 1, wherein said substrate is tubular.

23. The method of claim 1, wherein said substrate material is initially green.

24. The method of claim 1, wherein said substrate material is pre-sintered such that after the ceramic material is applied, only the ceramic material densifies in the firing step.

25. The method of claim 1, wherein said substrate material is selected from the group consisting of transition metals chromium, silver, iron, copper, and nickel.

26. The method of claim 1, wherein said substrate material is an alloy selected from the group consisting of a low-chromium ferritic steel, an intermediate-chromium ferritic steel, a high-chromium ferritic steel, a chrome-based alloy, and chrome-containing nickel-based Inconel alloy.

27. The method of claim 26, wherein said alloy is selected from the group consisting of Cr5Fe1Y and Inconel 600.

28. The method of claim 1, wherein said substrate material is a cermet selected form the group consisting of at least one of $La_{1-x}Sr_xMn_yO_{3-\delta}$ ($1 \geq X \geq 0.05$) ($0.95 \leq y \leq 1.15$) ("LSM"), $La_{1-x}Sr_xCoO_{3-\delta}$ ($1 \geq X \geq 0.10$) ("LSC"), $SrCo_{1-x}Fe_xO_{3-\delta}$ ($0.30 \geq X \geq 0.20$), $La_{0.6}Sr_{0.4}Co_{0.6}Fe_{0.4}O_{3-\delta}$, $Sr_{0.7}Ce_{0.3}MnO_{3-\delta}$, $LaNi_{0.6}Fe_{0.4}O_{3-\delta}$, $Sm_{0.5}Sr_{0.5}CoO_{3-\delta}$, yttria stabilized zirconia (YSZ), scandia stabilized zirconia (SSZ), $(CeO_2)_{0.8}(Gd_2O_3)_{0.2}$ (CGO), $La_{0.8}Sr_{0.2}Ga_{0.85}Mg_{0.15}O_{2.825}$ (LSGM20-15), $(Bi_2O_3)_{0.75}(Y_2O_3)_{0.25}$ and alumina, in combination with at least one of transition metals Cr, Fe, Cu, Ag, an alloy thereof, a low-chromium ferritic steel, an intermediate-chromium ferritic steel, a high-chromium ferritic steel, a chrome-based alloy, and chrome-containing nickel-based Inconel alloy.

29. The method of claim 28, wherein the LSM is selected from the group consisting of $La_{0.8}Sr_{0.2}MnO_{3-\delta}$, $La_{0.65}Sr_{0.30}MnO_{3-\delta}$, $La_{0.45}Sr_{0.55}MnO_{3-\delta}$.

30. The method of claim 28, wherein said chrome based alloy is Cr5Fe1Y.

31. The method of claim 1, wherein said coating material is solely an ionic conductor.

32. The method of claim 31, wherein said coating material comprises at least one of yttria stabilized zirconia (YSZ), scandia stabilized zirconia (SSZ), doped cerium oxide including $(CeO_2)_{0.8}(Gd_2O_3)_{0.2}$ (CGO), $La_{0.8}Sr_{0.2}Ga_{0.85}Mg_{0.15}O_{2.825}$ (LSGM20-15) and $(Bi_2O_3)_{0.75}(Y_2O_3)_{0.25}$.

33. The method of claim 32, wherein said coating in yttria stabilized zirconia.

34. The method of claim 33, wherein said yttria stabilized zirconia is at least one of $(ZrO_2)_{0.92}(Y_2O_3)_{0.08}$ and $(ZrO_2)_{0.90}(Y_2O_3)_{0.10}$.

35. The method of claim 1, wherein said coating is a mixed ionic electronic conductor.

36. The method of claim 35 wherein said coating comprises at least one of $SrCo_{1-x}Fe_xO_{3-\delta}$ ($0.03 \geq X \geq 0.20$), $La_{0.6}Sr_{0.4}Co_{0.6}Fe_{0.4}O_{3-\delta}$, $La_{0.8}Sr_{0.2}MnO_3$, $La_{0.65}Sr_{0.30}MnO_{3-\delta}$, $La_{0.45}Sr_{0.55}MnO_{3-\delta}$, $Sr_{0.7}Ce_{0.3}MnO_{3-\delta}$, $LaNi_{0.6}Fe_{0.4}O_{3-\delta}$, $Sm_{0.5}Sr_{0.5}CoO_{3-\delta}$ and $La_{1-x}Sr_xCoO_{3-\delta}$.

37. The method of claim 35, wherein said coating is $SrC_{0.75}Fe_{0.25}O_{3-\delta}$.

38. The method of claim 1, wherein said sintered coating material and said substrate have substantially matched coefficients of thermal expansion.

39. The method of claim 1, wherein said sintered coating material and said substrate have coefficients of thermal expansion within about 20% of one another.

40. The method of claim 1, wherein said sintered coating material and said substrate have coefficients of thermal expansion within about 10% of one another.

41. The method of claim 1, wherein said sintered coating material and said substrate have coefficients of thermal expansion within about 2% of one another.

42. The method of claim 1, wherein the electrochemical device substrate is a high-strength metal or alloy support, and further comprising casting a thin layer of a material having high electrocatalytic activity on top of the porous high-strength metal or alloy support.

43. The method of claim 42, wherein said the layer of material having high electrocatalytic activity comprises Ni-YSZ.

44. A method of forming a YSZ (Yittria Stabilized Zirconia) ceramic coating on an LSM (Lanthanum Strontium manganite) substrate using EPD (electrophoretic deposition), comprising:

providing the LSM substrate;

generating a suspension of YSZ material in a liquid medium of isopropyl alcohol (IPA) the suspension having a concentration and size distribution of YSZ particles selected to provide a uniform and intact dense ceramic following driving and sintering of the coated LSM;

applying a coating of the suspension of the YSZ material in a liquid medium to the LSM substrate material using EPD with a ramped voltage profile; and drying the coated LSM substrate; and sintering the coated substrate in an inert or reducing atmosphere.

45. The method of claim 44, wherein the voltage profile is ramped up to yield a current density of about 10 to 50 $\mu A/cm^2$.

46. The method of claim 44, wherein the size distribution is selected to reduce a firing time of the YSZ coated LSM substrate.

47. The method of claim 44, wherein the size distribution is selected to reduce a firing temperature of the YSZ coated LSM substrate.

48. The method of claim 44, wherein sizes of the YSZ particles range from about 0.1 to 1 microns.

49. The method of claim 44, wherein sizes of the YSZ particles are preferably about 0.3 microns.

50. The method of claim 44, wherein concentration of YSZ particles in the (IPA) is about 0.25 grams of YSZ material per 100 ml IPA to 1 gram of YSZ material per 100 ml IPA.

51. The method of claim 44, wherein the sintering is at a between about 1200 and 1400° C.

52. The method of claim 51, wherein the sintering is for a time between about 0.5 and 4 hours.

53. The method of claim 44, wherein the sintering is conducted at a temperature sufficient to substantially sinter and densify the coating without melting the substrate.

* * * * *

UNITED STATES PATENT AND TRADEMARK OFFICE
CERTIFICATE OF CORRECTION

PATENT NO. : 6,887,361 B1  
DATED : May 3, 2005  
INVENTOR(S) : Steven J. Visco et al.

Page 1 of 1

It is certified that error appears in the above-identified patent and that said Letters Patent is hereby corrected as shown below:

<u>Column 1,</u>
Line 23, after "Cross-Reference To related Applications", insert the following:

-- STATEMENT OF GOVERNMENTAL SUPPORT
This invention was made with government support under Contract DE-AC02-05CH11231 awarded by the United States Department of Energy to The Regents of the University of California for the management and operation of the Lawrence Berkeley National Laboratory. The government has certain rights in this invention. --.

Signed and Sealed this

Twenty-third Day of May, 2006

JON W. DUDAS
*Director of the United States Patent and Trademark Office*